Patented Apr. 17, 1945

2,374,157

UNITED STATES PATENT OFFICE 2,374,157

RED MONAZO WOOL DYES

Donovan E. Kvalnes, Penns Grove, N. J., assignor to E. I. du Pont de Nemours & Company, Wilmington, Del., a corporation of Delaware No Drawing. Application April 18, 1942,
Serial No. 439,558

6 Claims. (Cl. 260—199)

This invention relates to red monazo wool dyes, and especially to a class of such monazo dyes in which the coupling component is 2-amino-8-naphthol-6-sulfonic acid, the coupling is ortho to amino and the diazo component has a chloro- or bromo-acylamino side chain which is meta or para to the diazo group.

The compounds of the present invention are represented in general by the formula

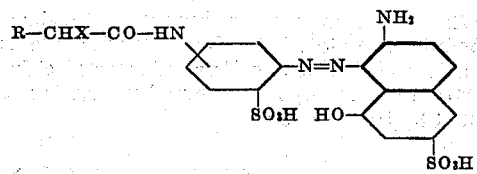

wherein X is chlorine or bromine, R is hydrogen or methyl and the group R—CHX—CO—HN— is meta or para to the azo group.

Dyes have been made heretofore which are similar in constitution to those of the present invention except that the group corresponding to the R—CHX—CO—NH— group is

CH₃—CO—NH— or C₆H₅CONH. The dyes of the present invention have a surprising fastness to perspiration, washing and fulling which is not possessed by the dyes of the prior art. Prior to applicant's invention, these improved properties could not have been accounted for by the difference in the side chain of the diazo component.

It is among the objects of the present invention to provide new fast-to-light red wool dyes which are further characterized by good fastness to washing, fulling and perspiration. Other objects of the invention will be apparent from the following description.

The objects of the invention may be attained by treatment of the known dyes

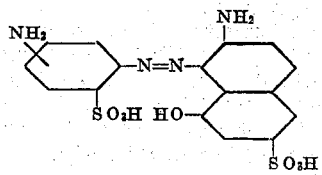

with an acid halide or anhydride of acids of the formula R—CHX—COOH in the presence of an acid acceptor or by diazotizing amines of the formula

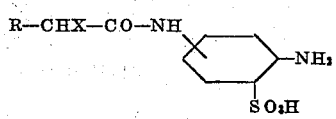

and coupling in an acid medium with 2-amino-6-sulfo-8-naphthol.

The invention will be more fully set forth in the following more detailed description which includes examples that are given as illustrative embodiments of the invention and not as limitations thereof. Parts are expressed in parts by weight unless otherwise noted.

Example 1

A solution of 265 parts of 2-sulfo-4-chloroacetylamino aniline in 1500 parts of water and 40 parts of sodium hydroxide are cooled to 0° C. by the addition of ice. Then 110 parts of 100% hydrogen chloride (as a 22% solution) are added, immediately followed by 69 parts of sodium nitrite (as a 30% solution). The temperature is maintained at 0–5° C. until diazotization is complete. The excess nitrous acid is destroyed by the addition of a small amount of sulfamic acid.

A clear solution of 250 parts of 2-amino-8-naphthol-6-sulfonic acid in 800 parts of water and 41.5 parts of sodium hydroxide, made slightly acid to blue litmus paper, is cooled to 10° C. by the addition of ice. The above diazo solution is added rapidly, and a solution of sodium acetate is added gradually until the coupling mixture is no longer acid to Congo red paper. When coupling is complete, the mixture is rendered alkaline to Brilliant Yellow paper by the addition of sodium hydroxide solution, and 10% salt by volume is added. The dye is isolated by filtration and dried at 40°–50° C. The compound is represented by the formula

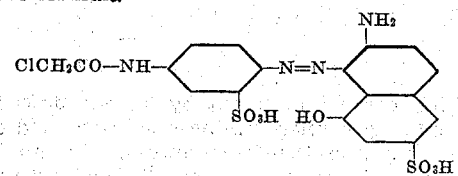

It dyes wool from an acid bath (for instance 3% sulfuric on the weight of the wool used) a pleasing bright red shade. The dyeing is similar in shade and light fastness but superior in fastness to perspiration, washing and fulling as compared to the corresponding dye containing an acetyl amino group.

The 2-sulfo-4-chloroacetylamino aniline is prepared by the slow addition of a little more than one equivalent of chloroacetyl chloride to an alkaline solution of one equivalent of sulfo p-phenylene diamine at 20–30° C. The chloroacetylamino compound may be isolated by the addition of acid or it may be diazotized directly and coupled to 2-amino-6-sulfo-8-naphthol without isolation.

*Example 2*

When 309 parts of 2-sulfo-4-bromoacetylamino aniline are used instead of the diazo component in Example 1, a red dye is obtained which is represented by the formula

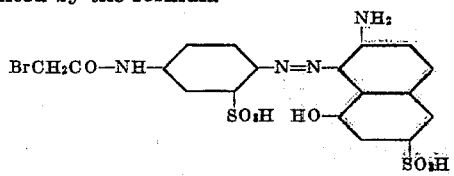

It is similar in shade and properties to the dye described in Example 1. The 2-sulfo-4-bromoacetylamino aniline is prepared from bromoacetyl bromide in a manner similar to that given in Example 1 for the preparation of the chloro compound.

*Example 3*

When 2-sulfo-5-chloroacetylamino aniline is used in place of the para-isomer in Example 1, a red dye is obtained which is represented by the formula

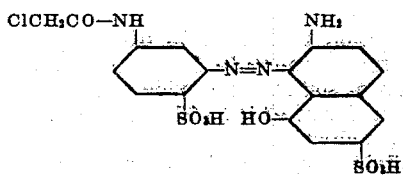

It is yellower in shade but otherwise similar in properties to the dye of Example 1.

The diazo component is prepared by treatment of sulfo-m-phenylene-diamine with sufficient chloroacetyl chloride so that the reaction mixture no longer couples with a test solution of a diazo component, showing that the amino group, which is para to the sulfonic acid group, is entirely converted to the chloroacetylamino group.

*Example 4*

A solution of 482 parts of the dye represented by the formula

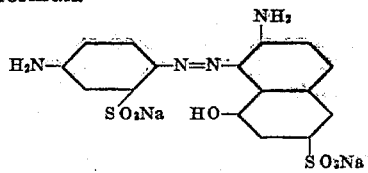

(which can be prepared by known procedures by coupling p-nitro-aniline-o-sulfonic acid diazo with 2-amino-6-sulfo-8-naphthol in an acid medium followed by making alkaline and reducing the nitro group with sodium sulfhydrate) in 8000 parts of water at 25° C. is treated gradually with 113 parts of chloroacetyl chloride (or with a solution of the latter in carbon tetrachloride). The reaction mixture is maintained slightly alkaline to Brilliant Yellow solution by the addition from time to time of sodium carbonate solution. More chloroacetyl chloride is added, if an acidified test portion of the reaction mixture gives a blue coloration with sodium nitrite solution. When the reaction is complete, a test sample upon the addition of acid and sodium nitrite does not give a blue color, showing that the amino group para to the azo linkage is completely converted to the chloroacetylamino product.

The dye is salted and isolated by filtration. It is represented by the formula

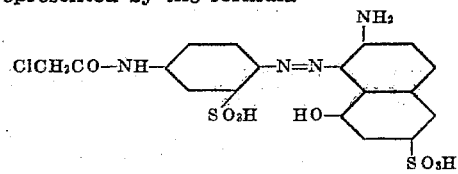

Its dyeing on wool is substantially identical in shade and properties with the dyeing described in Example 1.

*Example 5*

When an appropriate amount of chloroacetic anhydride in carbon tetrachloride is used in place of the chloroacetyl chloride of Example 4, a dye substantially identical in properties with the dye described in Example 4 is obtained.

*Example 6*

When an appropriate amount of bromoacetyl bromide in carbon tetrachloride is used in place of the chloracetyl chloride in Example 4, a dye is obtained which corresponds in properties to those of the dye described in Example 2.

*Example 7*

When an appropriate amount of 2-bromopropionyl bromide, in carbon tetrachloride solution, is used in place of the chloracetyl chloride in Example 4, a dye is obtained which is represented by the formula $$CH_3-CHBr-CO-NH-\bigcirc(SO_3H)-N=N-\bigcirc(HO)(NH_2)(SO_3H)$$

It dyes wool in red shades of good fastness to light, perspiration, washing and fulling fastness.

Besides the diazo components described in the foregoing examples, the following are illustrations of other arylamines which may be used to produce dyes similar to those described and in the manner described in the foregoing analyses, namely 2-sulfo-4-alpha-chloro-propionylamino aniline,
2-sulfo-4-alpha-bromo-propionylamino aniline,
2-sulfo-5-alpha-chloro-propionylamino aniline,
2-sulfo-5-alpha-bromo-propionylamino aniline and
2-sulfo-5-bromo-acetylamino aniline.

The dyes of the present invention produce red dyeings on wool which are similar in light fastness to the known dyes but with good wet fastness which is not possessed by the light fast red dyes of the prior art.

From the foregoing disclosure it will be recognized that the invention is susceptible of modification without departing from the spirit and scope thereof and it is to be understood that the invention is not restricted to the specific illustrations thereof herein set forth.

I claim:

1. A red monazo dye represented in its acid form by the formula $$R-CHX-CO-HN-\bigcirc(SO_3H)-N=N-\bigcirc(HO)(NH_2)(SO_3H)$$

wherein R is one of a group consisting of hydrogen and methyl, X is one of a group consisting of chlorine and bromine, the group

R—CHX—CO—HN— is in the 4 or 5 position with reference to the azo group and the SO₃H group of the diazo component is in the 2-position with reference to the azo group.

2. A red monazo dye in accordance with claim 1 in which the group R—CHX—CO—HN— is in the 4-position with reference to the azo group.

3. The red monazo dye in accordance with claim 1 in which X is chlorine.

4. The red dye represented by the formula

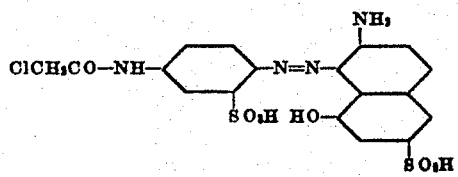

5. The red monazo dye represented by the formula

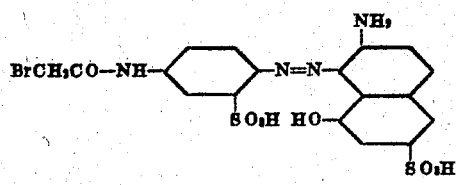

6. The red monazo dye represented by the formula

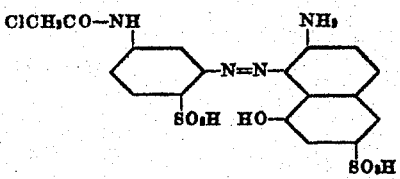

DONOVAN E. KVALNES.